Jan. 3, 1950    E. A. F. PRESSER    2,493,312
STUFFING BOX LUBRICATION
Filed May 2, 1946
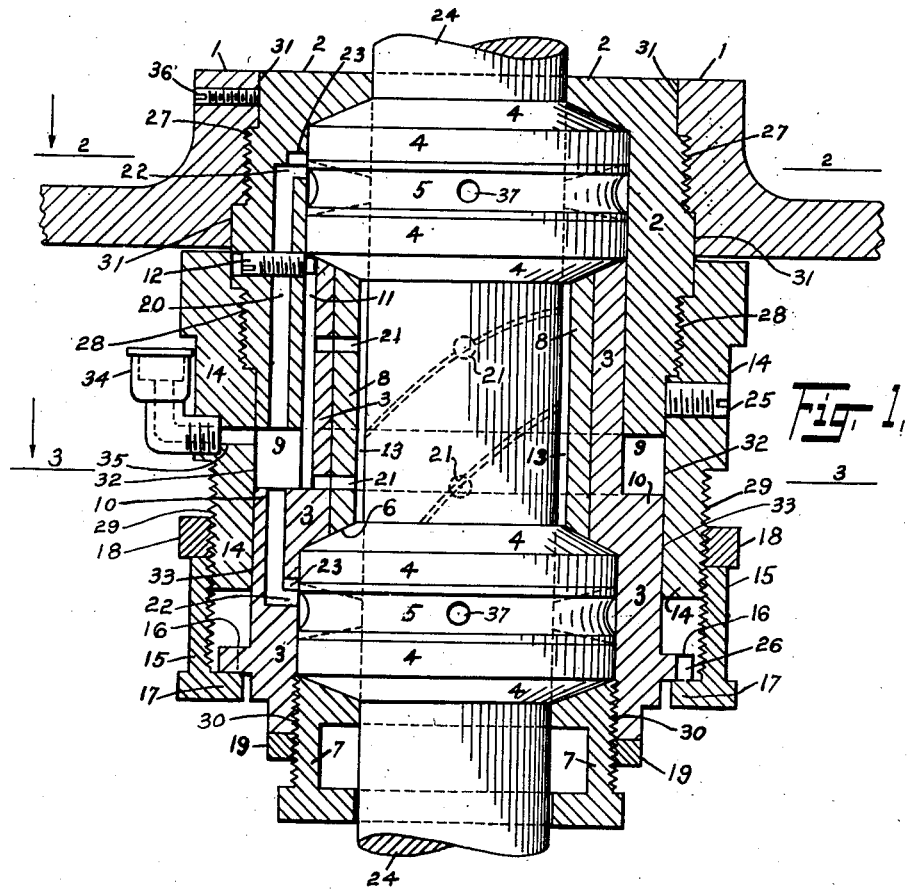
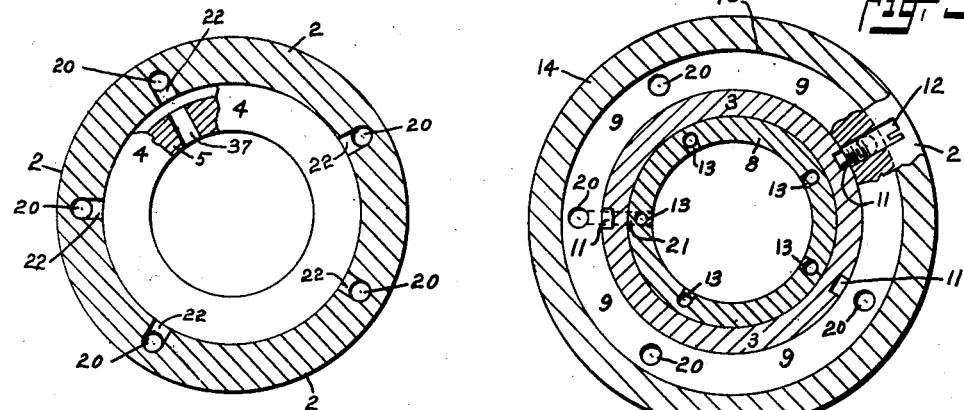
Eric A. F. Presser  INVENTOR.
BY M. S. Anstutz
ATTORNEY.

Patented Jan. 3, 1950

2,493,312

UNITED STATES PATENT OFFICE 2,493,312

STUFFING BOX LUBRICATION

Eric A. F. Presser, East Chicago, Ind.

Application May 2, 1946, Serial No. 666,590

1 Claim. (Cl. 308—36.1)

My invention relates to improvements in stuffing box lubrication and it especially includes the structure described in the following specification.

The purpose of my present invention is to provide a special means for distributing the lubricant; that insures a continuation of the distribution of lubricant even though the ordinary packing may become hardened; and that provides spacer rings to divide the usual packing into separate groups.

This application is a further development of the stuffing box application filed by me on April 20, 1945, under Serial No. 589,347, and the structure of the spacer rings is made the subject of my application, Serial No. 666,591, filed on May 2, 1946, now abandoned.

With these and other related ends I illustrate on the accompanying drawing such instances of adaptation as will show the broad principles of the invention without limiting myself to the specific details shown thereon and described herein.

Fig. 1 is a side elevation in section.
Fig. 2 is a cross section of Fig. 1 on line 2—2.
Fig. 3 is a cross section of Fig. 1 on line 3—3.
Figs. 2 and 3 are on a reduced scale.

In the practical adapting of my invention, I may use whatever changes in structure that the exigencies of varying conditions may demand, without departing from the broad spirit of the invention.

My stuffing box is composed of a housing 1 that may be a part of the frame of a pump or similar structure. It has threaded into it the upper stuffing box tubular sleeve 2. A long gland 3 is secured into sleeve 2 to control the packing 4 on each side of a spacer ring 5. This long gland forms the seat 6, for a second or lower stuffing box 4, which contains a similar arrangement of packings 4 and spacer ring 5 as is found in both stuffing boxes. A bottom gland screws into the long or upper gland 3 to complete the lower stuffing box.

This invention is specially adaptable to centrifugal pumps that circulate acids, or in the use of centrifugal air compressors which handle chemical gases and the packings protect the bearing which is thus maintained free from corrosion.

Between the two groups of packings 4 there is a phosphor bronze bearing bushing 8, that is lubricated from a source of oil grooves 13. This source of lubricant is in an annular chamber 9, formed between the cylindrical member 2, which forms the upper stuffing box seat and a side projection 10 of the long gland 3. Any suitable oil cup 34 is connected to the annular chamber by the passage 35.

The long gland 3 has axial grooves 11 in which the reduced diameter of set screws 12 are seated. This prevents the rotation of the bearing bushing 8. A long tubular sleeve 14 is threaded onto the upper stuffing box member 2 to close the annular lubricant chamber 9. An adjusting sleeve 15 is threaded onto 14 at the bottom. It serves to adjust the long gland 3 by reason of an annular flange 16 external of the gland at its bottom as it is engaged by an internal flange 17 of the adjusting sleeve 15. A locking ring 18 holds the sleeve against movement, and the short bottom gland 7 is also held in adjustment by a similar locking ring 19.

Vertical oil holes 20 are drilled upward from the annular lubricant chamber 9, and also downward to supply oil. The gland 3 is kept from rotation by a set screw 12 in the tubular member 3 and which engages slots 11 in the gland 3.

All of the axial adjustments of the different members are kept in alignment independently of any threaded portions. This insures an efficient and long life for all the connected parts. The two stuffing box groups are adjustable independently of each other. When the upper box is compensated by a movement of the long gland the lower box is shifted bodily along the shaft 24, without any change in the relation of its packing to the shaft. When its condition requires adjustment then such adjustment is made entirely independent of the upper box.

To keep the parts from unscrewing a set screw 25 is threaded in the sleeve 14. It abuts the part 2. The different parts are threaded into each other, at 27 between parts 2 and 1; 28 between parts 2 and 14; 29 between parts 14 and 15; and 30 between parts 7 and 3. Similarly the part 1 is prevented from unscrewing from the part 2, by a set screw 36.

The self aligning diameters are 31 for 1 and 2; 32 for 2 and 14; and at 33 between parts 3 and 14. The part 3 may be turned on its axis when needed by slots 26 in the flange 16 by a conventional spanner wrench.

Figures 2 and 3 show the relation of the oil holes and the slotted portion of the part 3, also the annular chamber 9 for the storage of lubricant. The oil holes at the right are displaced about 30 degrees from the horizontal which shows the right hand side of Figure 1 without the oil holes shown on the left hand side of the figure. All these oil holes may be spaced otherwise and changed in number.

The invention, as stated above, provides independent adjustment of the separate stuffing boxes without destroying the axial alignment of the entire assembly.

Transverse oil holes 21 are formed in the bushings 6 and the gland 3, and transverse oil holes 22 in the parts 2 and 3 lead to the spacer rings 5. The oil holes 20 are extended at 23 so as to maintain excess to the packing 4 when even though the packing material 4 has been compressed by the movements of the gland 3 and the gland 7, to change the lengthwise position of the spacer rings.

What I claim is:

In a detachable journal bearing unit a tubular member forming a seat for packing, a long gland for adjusting this packing and said gland being held against turning by means of a plurality of set screws, a separate similar diameter packing seat in the long gland, a packing in both packing seats, a separate gland in the long gland for the similar diameter packing, a separate bearing bushing between the two packing seats and their packings, and a shaft in engagement with both packings and the bearing bushing.

ERIC A. F. PRESSER.

REFERENCES CITED

The following references are of record in the file of this patent:

UNITED STATES PATENTS

| Number | Name | Date |
|---|---|---|
| 313,180 | Colwell | Mar. 3, 1885 |
| 450,518 | Mayer | Apr. 14, 1891 |
| 691,893 | Butler et al. | Jan. 28, 1902 |
| 1,043,603 | Jones | Nov. 5, 1912 |
| 1,507,575 | Brouse | Sept. 9, 1924 |
| 1,585,433 | Sudekum | May 18, 1926 |
| 1,670,368 | MacPherson | May 22, 1928 |
| 2,201,478 | Czarnecki et al. | May 21, 1940 |
| 2,204,310 | Holmquist | June 11, 1940 |

FOREIGN PATENTS

| Number | Country | Date |
|---|---|---|
| 259,319 | Germany | 1913 |